Aug. 24, 1965   O. J. B. ORWIN   3,202,259
CONVEYOR SYSTEMS FOR CONVEYING GOODS
Filed Dec. 17, 1963   4 Sheets-Sheet 1
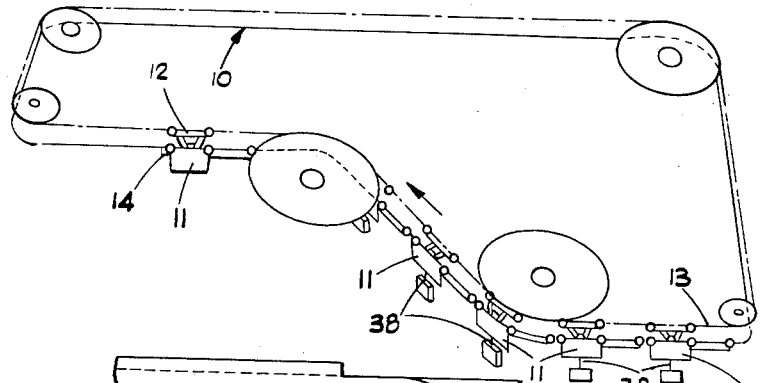
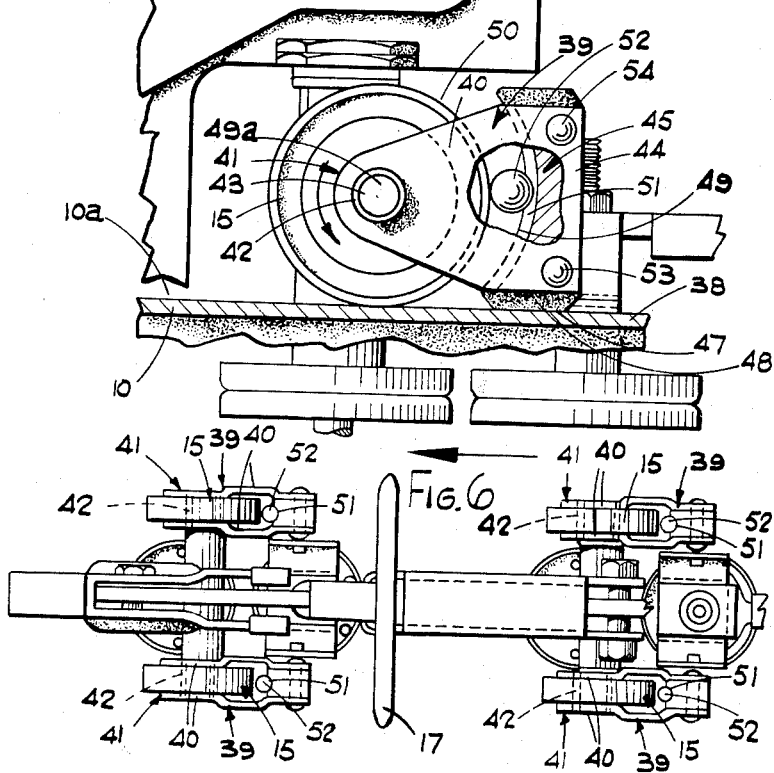
INVENTOR.
OLAF JOHN BARCLAY ORWIN

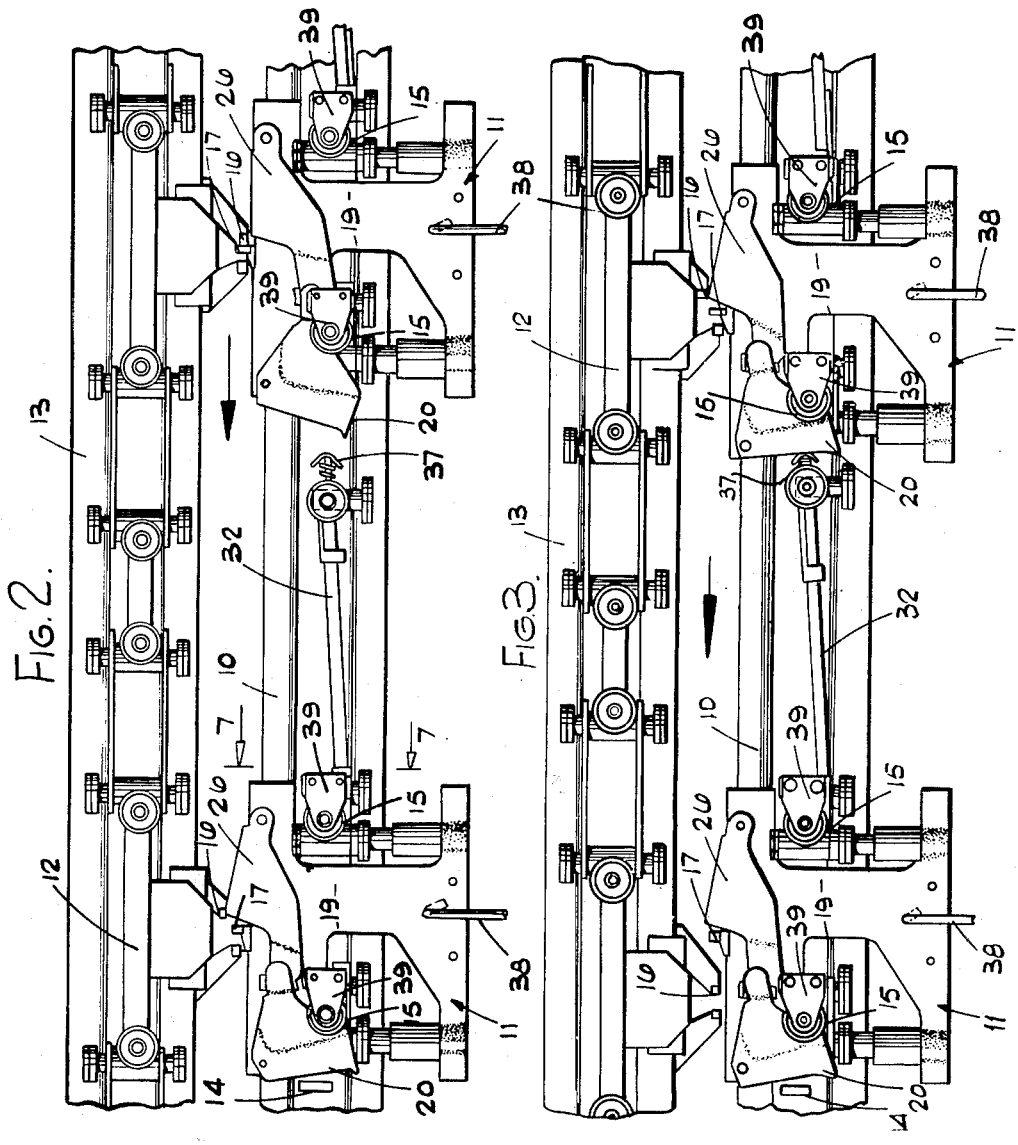

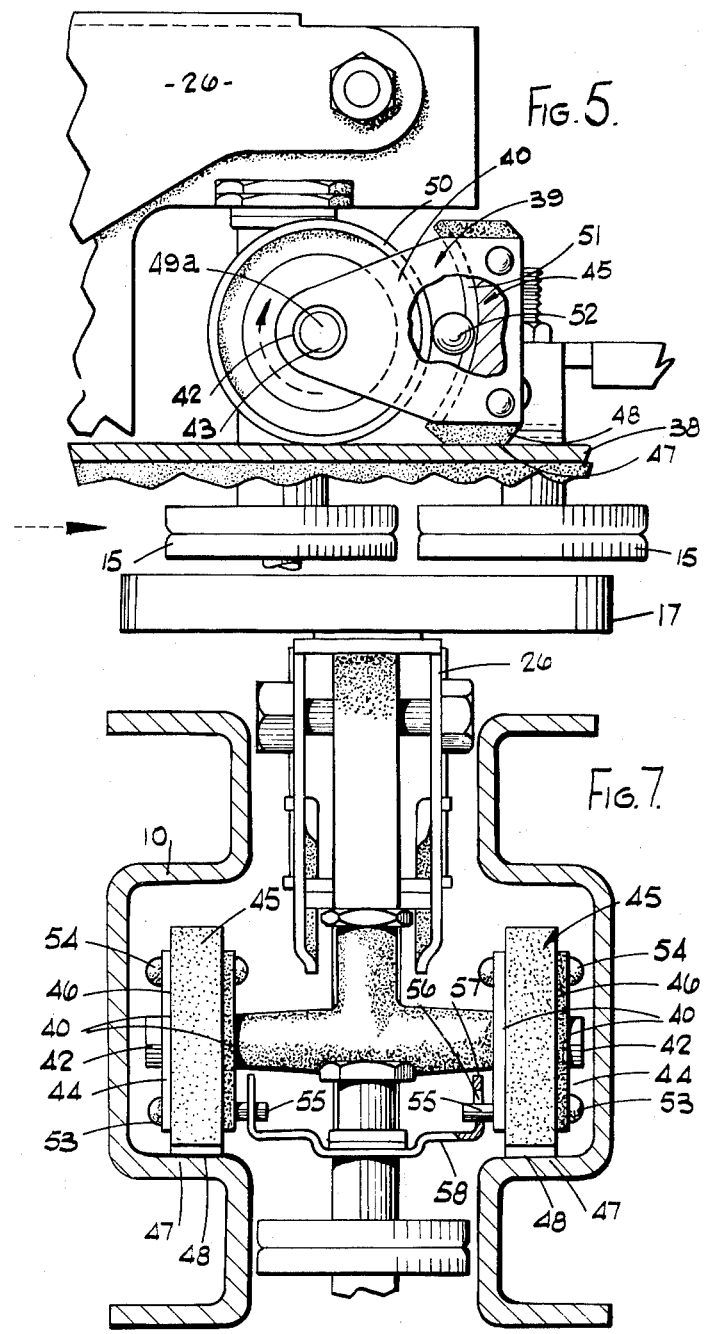

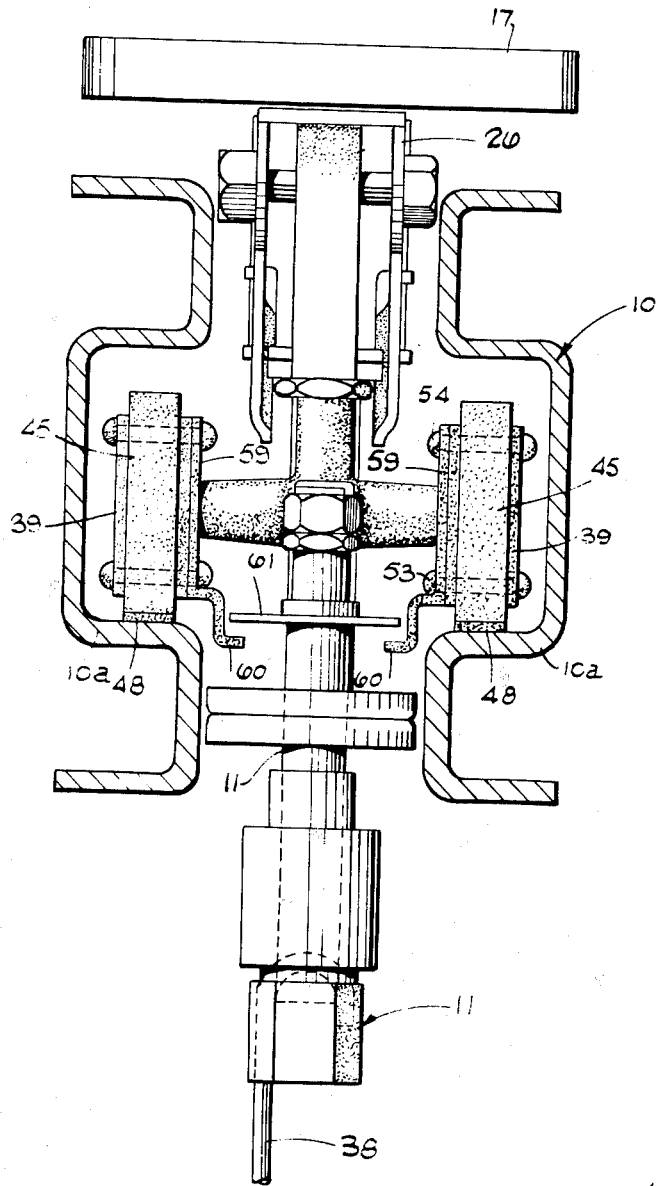

United States Patent Office 3,202,259
Patented Aug. 24, 1965

3,202,259
CONVEYOR SYSTEMS FOR CONVEYING
GOODS
Olaf John Barclay Orwin, Quinton, Birmingham, England, assignor to Fisher & Ludlow Limited, Tipton, England, a British company
Filed Dec. 17, 1963, Ser. No. 331,179
Claims priority, application Great Britain, Dec. 20, 1962, 48,243/62
7 Claims. (Cl. 198—1)

This invention relates to conveyor systems for conveying goods of the kind comprising a conveyor element such as an endless chain, a plurality of wheeled load supporting trolleys each embodying a plurality of load supporting wheels, a trolley track along which the trolleys are adapted to be advanced with their load supporting wheels in engagement with the trolley track, the trolleys being provided with means adapted to support their loads in suspension from the trolleys and so that the loads are free to swing relative to the trolleys and thus hang vertically irrespective of the disposition of the trolley track to the horizontal, and disconnectable drive transmitting means between the conveyor element and the trolleys, the arrangement being such that on disconnecting the drive from the conveyor element to one or more of the wheeled trolleys, the latter can be brought to rest at one or more selected positions along the length of the trolley track.

In conveyor systems of the foregoing kind, when the trolleys are brought to rest by the disconnection of the drive thereto from the conveyor element, the suspended loads oscillate relative to their respective trolleys, thus imparting a reverse or backward movement to the trolleys, whereby a trolley the drive to which has been disconnected may with its associated load undesirably engage with a following trolley or the load thereon, whereby damage to the loads themselves, and more particularly impairment of the proper operation of the conveyor system, including the operation of the drive disengaging means may result, so that the trolleys are no longer advanced and arrested in a controlled manner with the result that damage to the conveyor system itself may occur.

The foregoing undesirable reverse movement of the trolleys is particularly liable to occur where, as is usually the case, the conveyor system of the foregoing kind is provided with some form of stop means adapted positively to engage with a trolley the drive to which from the conveyor element has been disconnected, so as thereby to ensure that the trolley is brought to rest at the precise desired position, for example, by stop means provided by a buffer on a preceding already arrested trolley, as described in the specification of my prior U.S.A. patent application No. 318,900, filed October 25, 1963.

A trolley engaging such stop means in its operative positon is particularly liable to rebound, especially if the suspended load possesses appreciable momentum at the instant of arrest.

Proposals have been made for an anti-reverse device mounted on the trolley track. Such an arrangement is open to the objection that the trolleys must always be arrested at the precise location of the anti-return devices and if variation of the position of arrest is required, the anti-return devices must be re-disposed. Also such an arrangement is unsuitable for cases where following trolleys are arrested at any position along the length of their track by the operation of trolley mounted drive disengaging means actuated by the preceding already arrested trolley, e.g., in accordance with the arrangement described in the specification of my prior application aforementioned.

According to the present invention one or more of the load supporting wheels of each trolley are provided with braking means, each comprising the provision on the trolley body adjacent the periphery of the load supporting wheel of a wedge member having a wedging surface of concave configuration, the axis of curvature of which is eccentric in relation to the axis of rotation of the load supporting wheel, so that the wedge surface and load supporting wheel tread converge relatively in a direction around the periphery of the wheel, corresponding to the direction of wheel rotation when the trolley advances in the reverse as opposed to the forward direction, and a braking element in the form of a ball disposed between the tread of said trolley wheel and the wedge surface of said wedge member, the arrangement being such that for normal, i.e., forward direction of advancement, of the trolley, the braking element tends to be displaced in the direction of relative divergence between the tread and wedging surface to permit of free rotation of the trolley wheel, the braking element being displaced in the opposite direction, so as to become wedged between the wheel tread and the wedging surface in the event of the trolley commencing a reverse movement whereby such reverse movement is inhibited.

It is an essential feature of the present invention that the braking element is constructed in the form of a ball as opposed to a roller. While it would be theoretically possible for the braking element to be formed as a roller, such an arrangement would necessitate the provision of a relatively elaborate support for opposite ends of the roller to ensure that the axis of rotation thereof was always maintained parallel to the axis of rotation of the associated load supporting wheel, i.e., parallel to the axis of curvature of the adjacent part of the wheel tread.

The wheeled trolleys in conveyor systems of the foregoing kind are usually of a comparatively small size, they frequently operate in situations in which they are subjected to a considerable amount of dust and dirt, so that the supporting of braking elements in the form of rollers in the aforementioned position is attendant with considerable practical difficulty completely avoided by the employment of a braking element in the form of a ball, as this does not involve any problem of orientating its axis of rotation in relation to that of the associated trolley wheel.

Also the location of the ball between the two relatively converging surfaces is a simple matter, for example, by forming the wedging surface of the wedge member with a groove of part circular form in cross section, which extends partially around the adjacent tread of the wheel.

The wedge member preferably extends in a direction downwardly in relation to a horizontal plane containing the axis of rotation of the associated wheel with the wedge surface and wheel tread converging relatively in such direction with the wedge member terminating in such direction in a shoe capable of load transmitting engagement with the trolley track, the arrangement being such that for normal or forward advancement of the trolley along the track there is a slight clearance between the shoe and the adjacent track surface.

Preferably the wedge member is mounted for pivotal movement relatively to the associated trolley about the axis of rotation of the trolley wheel with which the wedge member is adapted to co-act, as above described, and the wedge member is provided with a trolley track engaging shoe and the arrangement is such that when the direction of advancement of the trolley is reversed so that the ball becomes wedged between the trolley wheel tread and the wedge member, the shoe is thereby forced into frictional engagement with the trolley wheel track, the shoe now acting as a drag having in contradistinction to the trolley wheel, area as opposed to line engagement with the track. Thus any tendency for the trolley to skid in the reverse direction with its wheels locked is greatly reduced by the now loaded shoe in area frictional engagement with the track.

The invention is illustrated in the accompanying drawings wherein:

FIGURE 1 is a perspective view of one form of conveyor of the kind hereinbefore specified and embodying one form of the present invention.

FIGURE 2 is a side elevation to an enlarged scale of part of the conveyor depicted in FIGURE 1 and showing two successively advancing trolleys with the advancement of the first trolley already arrested and the advancement of the second or following trolley about to be arrested.

FIGURE 3 is a view similar to FIGURE 2 but showing the position of the parts when the advancement of the second or following trolley has been arrested.

FIGURE 4 is a side elevation to an enlarged scale of part of one of the trolleys depicted in FIGURES 2 and 3 showing the construction of the braking means forming the present invention but depicting the braking means in the free position in which the trolley is advancing.

FIGURE 5 is a view similar to FIGURE 4 but showing the position of the parts with the braking means in operation.

FIGURE 6 is a plan view to an enlarged scale of one of the trolleys depicted in FIGURE 2 and showing certain details of the braking means.

FIGURE 7 is a sectional view on the line 7—7 of FIGURE 2 showing in more detail the construction of the retarding shoe and its relation to the trolley supporting track with which it is adapted to engage.

FIGURE 8 is a view similar to FIGURE 7 showing a modification.

Referring first to FIGURES 1 to 7 of the drawings, the conveyor there illustrated is of the general form described in the specification of my prior patent application aforementioned, comprising a trolley track 10, a plurality of wheeled trolleys 11 advanceable along the track, a conveyor element in the form of an endless chain 12 supported from a second or chain track 13, which with the conveyor chain 12 is disposed adjacent to and above the trolley track 10. Provision is made at one or more locations along the length of the trolley track 10 to effect arrest of the first of a succession of advancing trolleys, namely the provision of the particular stop member 14 shown in FIGURES 1, 2 and 3.

Each trolley 11 is provided with two pairs of supporting wheels 15 mounted on the trolley for free rotation about horizontal transverse axes, the wheels 15 being adapted to engage with supporting flanges 10a forming part of the trolley track 10, which trolley track is in the known manner of cruciform configuration in cross section as shown in FIGURE 7.

The conveyor chain 12 is provided at intervals along its length with dependent driving dogs 16 adapted to engage driving abutment 17 provided on the body 19 of the trolley 11. These driving dogs 16 are mounted for substantially vertical movement relative to the conveyor chain 12 for the purpose of disengaging the drive to the trolleys, for which purpose as described in the prior specification aforementioned, each trolley has mounted on the forward end thereof a striker member 20 operatively connected to dog lifting member 26.

Herein the expression "forward" and "rear" have reference to the designed direction of advancement of the trolleys when conveying goods along the trolley track as denoted by the full line straight arrow in FIGURES 2, 3 and 4.

As described more particularly in the prior specifications last mentioned to the rear end of each trolley is connected a tail element 32 carrying at its rear end a spring loaded stop element 37 adapted to engage with the forwardly directed face of the striker member 20 of the next following trolley to effect arrest thereof by displacing the striker member in a direction to cause the associated dog lifting member 26 to engage with and lift the corresponding chain driving dog 16 out of driving engagement with the trolley. Such action also occurs when the foremost of a number of successively advancing trolleys reaches the stop member 14 as described in the prior specification.

Thus when any one of the several trolleys is arrested either by the action of the stop member 14 in the case of the foremost trolley, or by the action of the tail element of a preceding trolley in the case of all but the foremost of several trolleys, the trolleys are brought to rest suddenly.

Each trolley is provided as shown in FIGURES 1 and 3 with suspension means, eg. load carrying hooks 38 by which the trolley loads indicated diagrammatically in FIGURE 1 are supported in suspension from the trolleys and the effect of the above described sudden arresting of the trolleys carrying the loads is to cause the latter to oscillate through their suspension means relative to the trolleys. Such oscillation must be permitted in that if the loads were connected rigidly to the trolleys, the impact arising from the sudden arresting of the loads as well as the trolleys would be liable to damage or break the suspension means as well as undesirably to stress the trolleys themselves.

The effect of such designed oscillation of the loads relative to the trolleys is to impart a reverse or backward thrust to the arrested trolleys causing these to tend to move in the reverse direction, i.e., opposite to that of the full line straight arrow in FIGURES 2, 3 and 4. This reverse movement if permitted would in the particular construction illustrated, in addition to having the undesirable effects earlier described in this specification, have the further undesirable effect of bringing the striker member of an arrested trolley out of engagement with the stop member 14 in the case of the foremost trolley, or out of engagement with the stop element 37 in the case of a following trolley, thereby permitting of the striker member 20 and its associated dog lifting member 26 moving gravitationally as described in the prior specification aforementioned from the trolley arrested position depicted in FIGURE 3, into the trolley advancing position depicted in the right hand side of FIGURE 2 so as to permit of such particular trolley being engaged by the next successively advancing driving dog 16 on the conveyor chain 12 and of the trolley being undesirably advanced whereby serious damage to the conveyor system and of the associated loads could result.

The foregoing disadvantages are avoided in accordance with the present invention by providing one or more of the supporting wheels 15 of each trolley with braking means in accordance with this invention. Preferably and as shown the foremost and the rearmost pair of supporting wheels 15 on each trolley are provided with such braking means, the construction of which is shown more particularly in FIGURES 4 to 7.

Such braking means comprise the provision of each of the pairs of trolley supporting wheels 15 with a two armed bracket 39, the two arms 40 of the bracket in a direction towards their free ends 41 extending in the designed direction of advancement of the trolley 11 and embracing opposite sides of the associated wheel 15. The arms 40 adjacent their free ends 41 are formed with aligned holes, which are a running fit on the periphery of the customary bearing bush 42 provided between the associated trolley wheel 15 and its supporting spindle 43, i.e. the arms 40 are a running fit on the bush 42 which is mounted on the spindle 43 so that no relative rotation occurs at such position.

Each bracket 39 extends by a short distance, e.g., of the order of ⅜″ rearwardly beyond the adjacent tread of the wheel.

Between the two arms 40 of the bracket at the rear end thereof is disposed a wedge member 45 which as viewed in side elevation is of somewhat L configuration with the longer limb 46 extending vertically between the rear ends of the two bracket arms 40, and with the underside 47 of the shorter limb 48 horizontal and being disposed adjacent the upper or running surface of the trolley track flange 38.

The L shaped wedge member 45 on the side thereof which is directed towards the adjacent wheel tread, is shaped to part circular convex configuration at 49 with its axis of curvature 49a parallel to but somewhat above the level of, i.e., eccentric to the axis of rotation of the adjacent wheel 15, so that this curved eccentrically disposed face 49 presents a wedging surface to the adjacent part of the circular tread 50 of trolley supporting wheel 15. This wedging surface 49 terminates at the forward extremity of the lower, shorter, horizontal limb 47 of the wedge member at a position a short distance, e.g., 3/8" in rear of a vertical plane containing the wheel axis.

This curved wedging surface 49 is formed with a groove 51 concentric with the axis of curvature 49a of the wedging surface 49, but of width less than the width of the surface in a direction parallel to the wheel axis; the groove 51 being of part circular form in cross-section, so as to have a depth somewhat less than the radius of ball 52 housed partially within the groove 51 and which constitutes the braking element. Such ball is accordingly provided between the wedge surface 49 and the adjacent wheel tread 50 and is located by groove 51 against lateral movement, i.e., in a direction substantially parallel to the wheel axis.

The arrangement is such that for the normal forward direction of advancement of the trolley, each load supporting wheel thereof provided with this braking or antireturn device, will have that part of its tread 50 which is directed towards the wedging surface 49 moving in an upward direction relative to the surface as denoted by the curved full arrow in FIGURE 4, so as to displace the ball 52 away from the direction of relative convergence between the tread 50 and wedging surface 49, so that the ball does not exert any retarding effect on the trolley wheel 15. The ball 52 will in fact be in only light contact with tread 50 and wedging surface 49 as exaggerated by the small clearance to one side of the ball which is shown in FIGURE 4.

In the event, however, of the trolley wheel 15 tending to reverse its direction of rotation consequent on the foregoing reverse or rebound movement of the trolley, so that the wheel now turns in the opposite direction denoted by broken arrow in FIGURE 5, the ball 52 is at once displaced by its engagement with the wheel tread 50 in a downward direction to a small extent, i.e. in the direction of convergence between the tread 50 and wedging surface 49 so as effectively to lock the wheel 15 against further rotation in this direction.

Each of the brackets 39 is as shown in FIGURE 7 secured to wedge member 45 by a pair of vertically spaced pins 53, 54 which extend through bracket arms 40. The free end 55 of the lower of the two pins 53 extends through a hole 56 provided in the adjacent upstanding arm 57 of a channel shaped bracket 58 secured to the underside of the plate-like trolley body 19.

Each of these pin receiving holes 56 has a bore larger than, i.e., approximately twice the diameter of the pin end 55 received therewithin. The arrangement permits of each wedge member 45 with its associated two arm bracket 39 having limited pivotal movement relative to the trolley body about the axis of the associated trolley wheel spindle 43. The arrangement is such that for the normal direction of rotation of the trolley wheels as shown by the curved arrow in FIGURE 4 there is no danger of the bracket 39 with its associated wedge member 40 under any frictional engagement between the latter through the ball 52 and the wheel 15 being dragged round with the wheel over the upper side of the wheel. At the same time the wedge member is free to move downwardly so that the part 48 thereof can have braking engagement with the trolley track in the manner now to be described.

The arrangement is such that when each trolley 11 tends to move in a direction the reverse of the designed direction under the circumstances above described so that each trolley wheel 15 now rotates in the direction indicated by the broken arrow in FIGURE 5, i.e., in a clockwise direction as viewed in that figure, the resultant wedge engagement between each ball 52 and the wedging surface 49 applies a downward reaction to the wedging member 45 causing this with its associated bracket 39 to pivot in a downward direction about spindle 43 to the extent permitted by the difference in diameter between hole 56 and pin end 55.

As a result the foot provided by the shorter limb 48 of wedge member 45 is now forced into pressure engagement with the adjacent trolley track flange 10a so that the so provided foot 48 acts as a skid or drag in further restraining the reverse movement of the trolley particularly in the event of the trolley wheels in engagement with the balls 52 becoming locked and themselves tending to skid on the trolley track.

For the normal direction of advancement of the trolleys as designated by the straight arrows in FIGURES 2, 3 and 4, the foot 48 will run on the upper surface of the corresponding trolley track flange 10a but as under these conditions the ball 52 is not in wedge engagement with the wedge member 45, the foot 48 is not forced as earlier described into pressure engagement with the flange 10a but is only in engagement therewith under the weight of each bracket 39 and associated wedge member 45. As the mass of these parts is small, each foot 48 for the normal direction of advancement of the associated trolley will run lightly on the flange 10a and the associated frictional drag and wear will then be very small.

In FIGURE 8 there is depicted a slight modification of the construction shown in FIGURES 1 to 7 in which pivotal movement of each bracket 39 with its associated wedge member 45 in an upward direction when the trolley is advancing in the normal forward direction is prevented in a manner alternative to the arrangement shown in FIGURE 7. In this alternative arrangement the bracket 58 of FIGURE 7 is omitted and the two pins 53, 54 which secure the bracket arms to the wedge member also secure to the bracket 39 a stop plate 59 disposed on the side of the bracket 39 which is nearest to the trolley body 19. The lower end of each stop plate 59 is formed with a lug 60 which projects towards the central longitudinal plane of the trolley, each lug being adapted to engage with the underside of a stop washer 61 mounted on the adjacent part of the trolley body, there being clearance between the lug 60 and the stop washer 61 so as to permit of each foot 48 having limited vertical movement relatively to the associated trolley to the extent necessary to permit of the foot having pressure engagement with the adjacent track flange 10a or else merely engaging lightly therewith according to the direction of advancement of the trolley.

If desired the braking means above described may be provided on only one pair of supporting wheels 15 or if the load to be carried is very light it may be provided on one only of the four such wheels 15 of each trolley.

The present invention provides a simple, inexpensive but extremely effective arrangement for preventing undesired reverse movement of wheeled trolleys in conveyor systems of the foregoing kind, which arrangement is further not likely to get out of order so as to retain its effectiveness over an extended period.

What I claim is:

1. A conveyor system including a plurality of wheeled load supporting trolleys and a supporting trolley track along which the wheeled trolleys are adapted to be advanced, a load supporting wheel of each trolley having braking means, each braking means comprising a wedge member on the trolley adjacent the periphery of the load supporting wheel, the wedge member having a wedging surface of concave configuration, the axis of curvature of which is eccentric in relation to the axis of rotation of the load supporting wheel, so that the wedge surface and load supporting wheel tread converge relatively in a direction around the periphery of the wheel, corresponding to the direction of wheel rotation when the trolley advances in the reverse as opposed to the forward direction, and a braking element in the form of a ball disposed between the tread of said trolley wheel and the wedge surface of said wedge member, the arrangement being such that during normal, i.e., forward direction of advancement, of the trolley, the braking element tends to be displaced in the direction of relative divergence between the tread and wedging surface to permit of free rotation of the trolley wheel, and during any reverse movement of the trolley the braking element is displaced in the opposite direction, so as to become wedged between the wheel tread and the wedging surface.

2. A conveyor system according to claim 1 further characterised in that the wedge member is mounted for pivotal movement relative to the associated trolley about the axis of rotation of the load supporting wheel of the trolley with which the wedge member is adapted to co-act and the wedge member is provided with a trolley track engaging shoe, the arrangement being such that when the direction of advancement of the trolley is reversed from the normal direction so that the ball is displaced into wedge engagement with the wedge member, and the pressure of the ball on the wedge member displaces this relative to the trolley in a direction to bring the shoe into pressure engagement with the trolley track so that the shoe acts as a drag in assisting in resisting the reverse movement of the trolley.

3. A conveyor system according to claim 1, wherein the wedge member is mounted between a pair of arms which extend on opposite sides of the associated trolley wheel, means mounting said arms from a bearing member which supports the trolley wheel in such a manner that the arms can pivot relative to the trolley about the axis of rotation of the trolley wheel, the wedge member having a trolley track engaging shoe, the arrangement being such that when the direction of advancement of the trolley is reversed from the normal direction so that the ball is displaced into wedge engagement with the wedge member, and the pressure of the ball on the wedge member displaces this relative to the trolley in a direction to bring the shoe into pressure engagement with the trolley track so that the shoe acts as a drag in assisting in resisting the reverse movement of the trolley.

4. A conveyor system according to claim 1, further characterised in that the wedge member is mounted for pivotal movement relative to the associated trolley about the axis of rotation of the load supporting wheel of the trolley with which the wedge member is adapted to co-act, means for positively limiting the upward pivotal movement of the wedge member relative to the associated trolley about the axis of rotation of the associated load supporting wheel of the trolley, and said wedge member being provided with a trolley track engaging shoe, the arrangement being such that when the direction of advancement of the trolley is reversed from the normal direction so that the ball is displaced into wedge engagement with the wedge member, and the pressure of the ball on the wedge member displaces this relative to the trolley in a direction to bring the shoe into pressure engagement with the trolley track so that the shoe acts as a drag in assisting in resisting the reverse movement of the trolley.

5. A conveyor system according to claim 3, wherein the wedge member is secured to the bracket by a pin extending through the two arms of the bracket, part of the pin also extending within an opening of bore larger than the diameter of such part of the pin and provided in a portion of the trolley, the arrangement serving to limit the pivotal movement of the wedge member relative to the trolley body about the axis of rotation of the associated trolley wheel.

6. A conveyor system according to claim 3, wherein each wedge member supporting bracket is connected to a stop member adapted to engage beneath stop member mounted on the trolley body in such a manner as to restrain the upward pivotal movement of the wedge member relative to the trolley.

7. A conveyor system according to claim 1, wherein the wedge surface of the wedge member is formed with a groove extending circumferentially in relation to the axis of curvature of the wedge surface, which groove receives part of the ball and serves to locate the ball against movement in a direction parallel or substantially parallel to the axis of rotation of the trolley wheel with which the ball is adapted to engage.

No references cited.

SAMUEL F. COLEMAN, *Primary Examiner.*

WILLIAM B. LA BORDE, *Examiner.*